United States Patent [19]

Inness-Brown

[11] 4,247,181
[45] Jan. 27, 1981

[54] KALEIDOSCOPIC PROJECTOR

[76] Inventor: Lee M. Inness-Brown, 7447 Fay Ave., La Jolla, Calif. 92037

[21] Appl. No.: 33,906

[22] Filed: Apr. 27, 1979

[51] Int. Cl.³ .................. G03B 21/28; G03B 21/00
[52] U.S. Cl. .......................................... 353/1
[58] Field of Search ................ 353/1, 2; 350/4.1, 4.2

[56] References Cited

U.S. PATENT DOCUMENTS

| 1,990,867 | 2/1935 | Harvey | 350/4.1 |
| 2,553,005 | 5/1951 | Regan | 353/2 |
| 3,600,076 | 8/1971 | Synder | 353/1 X |

FOREIGN PATENT DOCUMENTS

| 575243 | 4/1924 | France | 353/1 |
| 443064 | 12/1948 | Italy | 353/1 |

Primary Examiner—Harry N. Haroian
Attorney, Agent, or Firm—Frank D. Gilliam

[57] ABSTRACT

A kaleidoscopic projector which is capable of projecting kaleidoscopic images having widely variable image characteristics. Means are included permitting continuous cycling variations in projected image content, kaleidoscopic effect, focus and light intensity. An improved optical system provides improved projected image intensity and focus uniformity. The kaleidoscopic effect may be varied by means to cyclically or selectively vary the angle between the mirrors in the kaleidoscopic mirror set. Means for selectively providing optical dissolves is included. An improved air cooling system permits brighter projected images.

8 Claims, 6 Drawing Figures

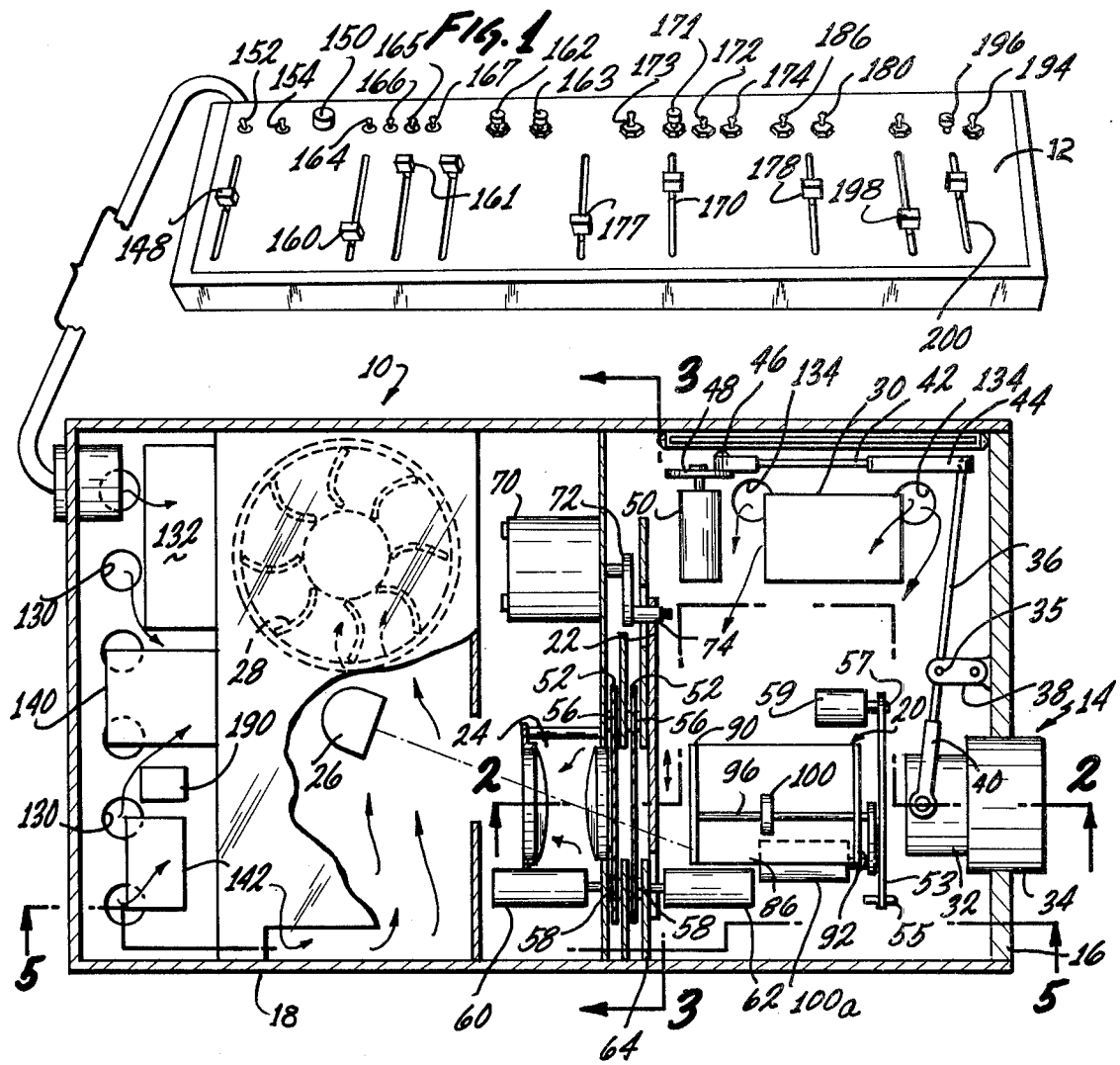
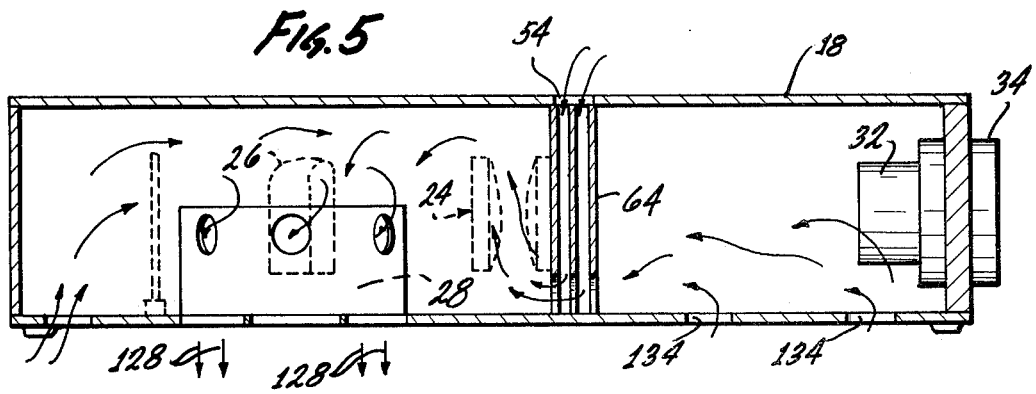

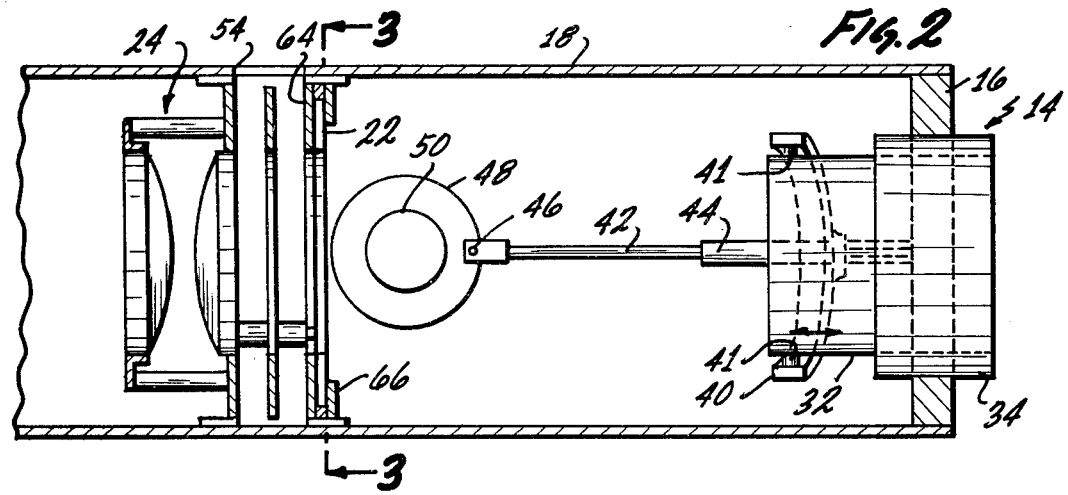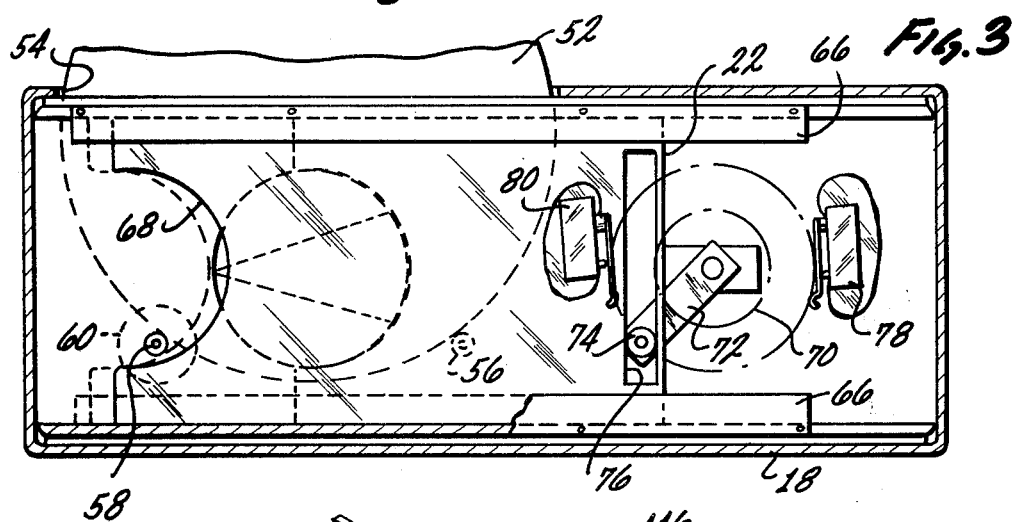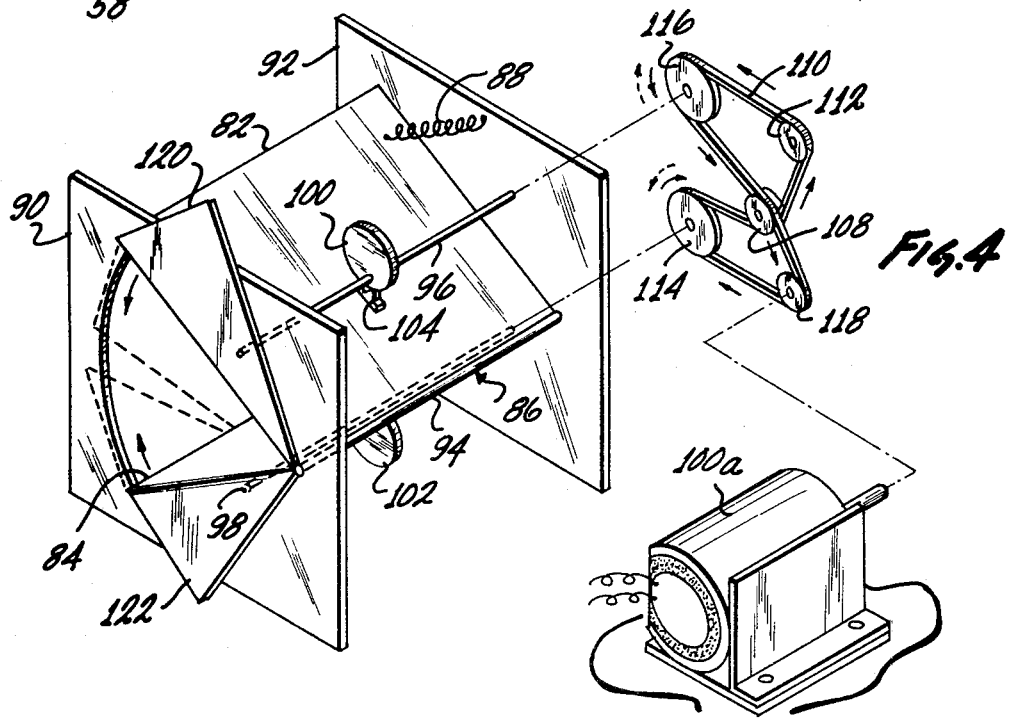

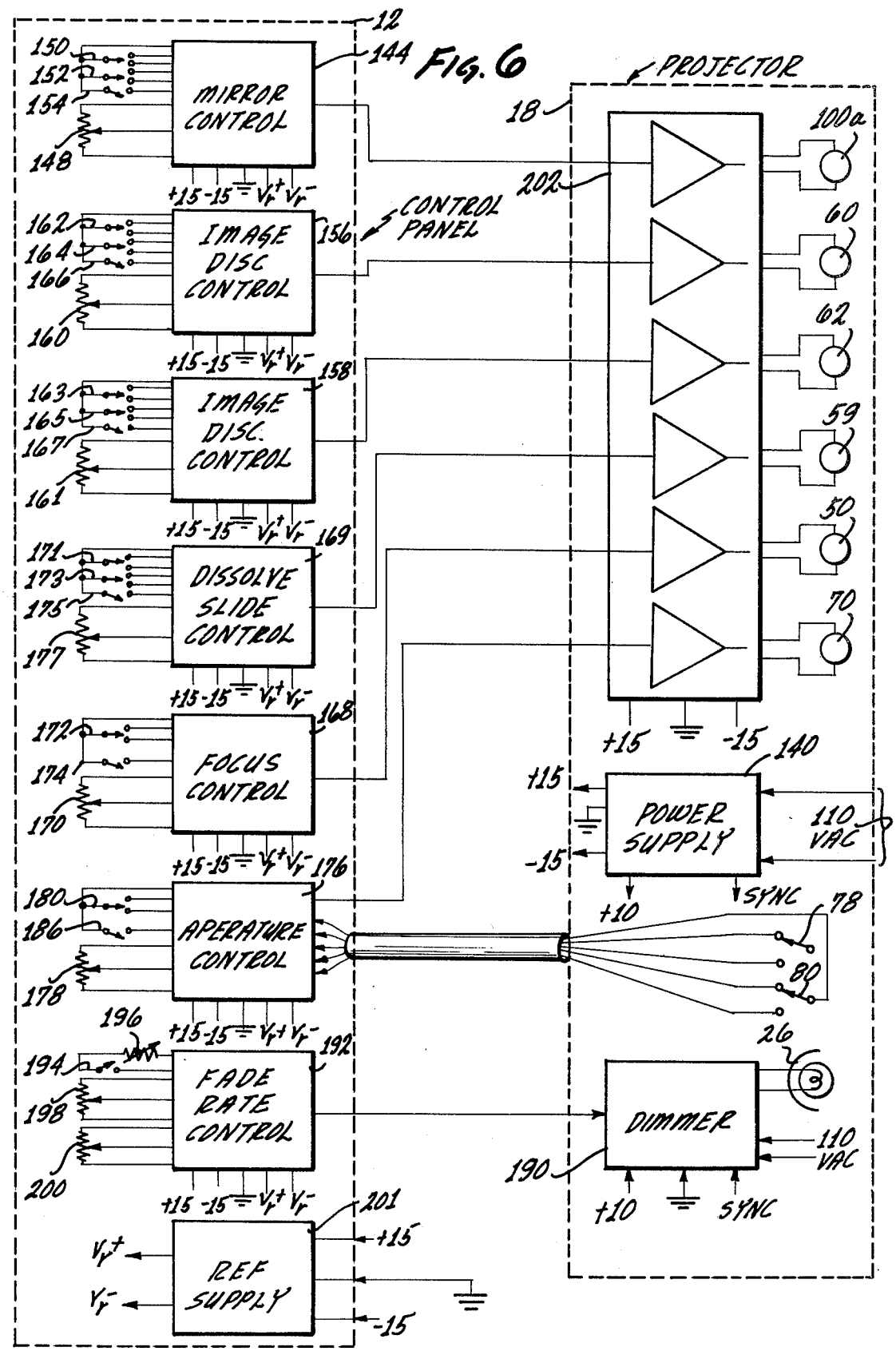

KALEIDOSCOPIC PROJECTOR

BACKGROUND OF THE INVENTION

This invention relates in general to kaleidoscopic image projectors and, more specifically, to kaleidoscopic projectors capable of selectively and automatically cyclically varying a number of image characteristics.

Many projectors have been designed in which an image reflected from a kaleidoscopic mirror set (e.g., two planar mirrors in contact along one edge are maintained at an angle to each other of, typically, 60°)is produced on a screen. The original image may come from a photographic slide, colored particles between transparent windows, etc. The multiple image patterns which result are generally quite esthetically pleasing. Movement of the mirror set and/or the original image material produces continuous changing colored patterns.

Prior kaleidoscopic projection systems have, however, suffered from a number of problems. Often, image focus and intensity across the viewing surface was not uniform. Attempts have been made to improve these characteristics by placing the projection lens at an angle to the mirror set (e.g., Regan U.S. Pat. No. 2,553,005), viewing only a fan-shaped portion of the circular image (e.g., Eddy Pat. No. 2,307,202), etc. However, none of these arrangements have solved the intensity and focus uniformity problems.

Prior kaleidoscopic projectors have been capable of varying the optical and esthetic effects of the projected images only by varying the original images being projected. Thus, with continued viewing, the viewer tends to become bored when viewing only slightly changing projected images.

Thus, there is a continuing need for improvements in projected kaleidoscopic image quality and for further means to vary the image characteristics.

OBJECTS OF THE INVENTION

It is, therefore, an object of this invention to provide a kaleidoscopic projection system overcoming the above-noted problems.

Another object of this invention is to provide a kaleidoscopic projection system producing a projected image having improved uniformity of focus and intensity across the image.

A further object of this invention is to provide a kaleidoscopic projection system having means for varying image content selectively or continuously cyclically over a wide range of variations.

Another object of this invention is to provide a kaleidoscopic projection system including means for selectively or continuously cyclically varying projected image focus.

Still another object of this invention is to provide a kaleidoscopic projection system including means permitting variation in optical aperture and enabling optical dissolves to be accomplished.

Yet another object of this invention is to provide a kaleidoscopic projection system including means to selectively vary the kaleidoscopic effect during projection.

SUMMARY OF THE INVENTION

The above objects, and others, are accomplished in accordance with this invention by a kaleidoscopic projection system having an improved optical system and including various means for selectively or continuously cyclically varying a number of image characteristics. The basic kaleidoscopic projection system comprises a housing having a projection lens therein extending outwardly through one end wall. A kaleidoscopic mirror set comprising a set of planar mirrors in contact along one edge of each mirror is located adjacent to the projection lens with the planes of the mirrors substantially parallel to the projection lens axis. A condensing lens set is located adjacent to the mirror set along the same axis. A projection lamp is located next to the condensing lens set at an angle thereto. The angular relationship of the lamp improves projected image quality, as detailed below.

The original images to be projected are located on two or more rotatable disks positioned between the condensing lens set and the mirror set. When the disks are rotated at different speeds, images having rapidly varying content with a long repetition cycle are produced.

Means are provided to vary the focus of the projection lens. Focus may be set to produce a sharp image of one disk image on the projection screen, or to produce any selected degree of overall sharpness, or may be set to vary in a continuous cyclically manner over a selected focus range.

Means are provided to vary the angular relationship between the mirrors in the kaleidoscopic mirror set during projection to change the projected kaleidoscopic effect. This may either be changed selectively or may be caused to continuously vary over a selected range in a cyclical manner.

Further means are provided to vary image size through a variable aperture mechanism.

All of these means to vary image characteristics may be controlled electronically through switch means on a control panel to produce virtually limitless variations in projected images. Further, two or more projectors may be used together cooperating such as by dissolves or fades from one projector to another.

BRIEF DESCRIPTION OF THE DRAWING

Details of the invention, and or a preferred embodiment thereof, will be further understood upon reference to the drawing, wherein:

FIG. 1 is a schematic plan view showing the kaleidoscopic mechanism and control panel;

FIG. 2 is a section view taken on line 2—2 in FIG. 1, showing the projection lens focussing mechanism;

FIG. 3 is a section view taken on line 3—3 in FIG. 1, showing the aperture control means;

FIG. 4 is a perspective, partially exploded, view of the kaleidoscopic mirror angle varying means;

FIG. 5 is a schematic section view taken on line 5—5 in FIG. 1, illustrating the cooling air flow paths; and FIG. 6 is an overall schematic electrical block diagram showing the means for selectively varying kaleidoscopic characteristics.

DETAILED DESCRIPTION OF THE INVENTION

Referring now to FIG. 1, there is seen a schematic plan view of the projection kaleidoscope 10 with the top removed, together with the control panel 12 therefor. A conventional projection lens 14 extends through one end wall 16 of housing 18. Means for focussing lens 14 is disclosed in FIG. 2, as detailed below. Adjacent to lens 14, and in optical alignment therewith, is located a kaleidoscopic mirror set 20 (shown in further detail in FIG. 4).

Adjacent to mirror set 20 and in optical alignment therewith is a means for varying image size. This image size varying means includes a slide 22 movable between a position blocking light passing along the optical axis of lens 14 and a position permitting light to pass along that axis. This image size varying means is described in detail below with respect to FIG. 3. If desired, a conventional iris diaphragm could be used in place of slide 22.

A conventional condensing lens set 24 is positioned adjacent to slide 22 along the optical axis of projection lens 14 and serves to condense light from conventional projection lamp 26 and direct it along said optical axis. Projection lamp 26 is offset from the axis of the optical system at an angle of from about 6 to 15 degrees, said angle lying in the plane of the line along which the kaleidoscopic mirrors meet. It has been found that this arrangement results in improved uniformity of light intensity and image focus across the projected image on the projection screen. If desired, a single hyperbolic lens could be used in place of condensing lens set 24.

A conventional cooling air blower 28 is provided next to projection lamp 26 to cool the various electronic components, motors, image disks, projection lamp, etc., within housing 18. The blower receives air from within housing 18 and exhausts it out of the bottom of the housing. The highly efficient air flow pattern produced is described in detail in conjunction with the description of FIG. 5, below.

Various electrical and electronic components are located in suitable housings at the left side of housing 18 as seen in FIG. 1 and in a box 30. These components are further shown in FIG. 6.

An eccentric arm system, as seen in FIGS. 1 and 2, is used to selectively focus projection lens 14. The dissolve system, including slide 53 and motor 59, (described below) are omitted from FIG. 2 for clarity of illustration. The focussing elements (or the entire lens) of lens 14 are enclosed within a tubular member 32 axially slidable within the extended outer portion 34 of lens 14. An elongated arm 36 is pivoted near its center at pivot link 38 and has a semi-circular end portion 40 connected to member 32 by pivot pins 41. Pivot line is pivotably connected to arm 36 through pin 35 and to a bracket 37 through pin 39. Pivot link 38 is sufficiently loose so as to permit pins 41 to move in a substantially straight line parallel to the axis of lens 14 despite the ordinarily slightly arcuate movement of the end of rod 36. The end of rod 36 opposite to end 40 is flexibly connected to an end portion 44 of rod 42. End portion 44 may be adjustable in length, if desired, to permit manual lengthening or shortening for focus pre-adjustment. The second end of rod 42 is loosely connected to an offset pin 46 eccentrically mounted on disk 48 which is centrally mounted on the output shaft of motor 50 for rotation. As motor 50 is rotated, rod 42 moves back and forth, pivoting arm 36, moving member 32 to change the focus of lens 14. Thus, an operator may rotate motor 50 in slight, selected, increments to focus any of several image disks (as discussed below) on a projection screen. Or, motor 50 may be operated continuously to continuously vary projected image focus in a cyclical manner.

The original images being focussed are mounted on two or more parallel disks 52 as seen in FIG. 3. These disks, which may have various diameters, are inserted through slots 54 in the top of housing 18 (extending above the top while in use for easy removal and improved cooling) and rest on pairs of rotatable rubber bearing rollers 56 and rubber motor drive rollers 58. Motors 60 and 62 rotate the front and back image disks 52, respectively, through the drive rollers 58. These motors may be rotated in the same or opposite directions, at various speeds, as desired. Disks 52 may have the same or different diameters. Where disk diameters are different, the centers of the disks will always lie along the same vertical line, because the support rollers are equally spaced. This vertical symmetry permits the use of many different disk sizes, since the center lowest area on all disks will be aligned on the system optical axis.

Disks 52 may bear any desired image material. For example, photographic transparencies, colored transparent paint, hollow disks filled with colored particles or colored immiscible liquids, grids, and patterns of holes (which, when combined, make more patterns), polarizing and birefrinent materials, or any combination thereof may be used. A dissolve mechanism, operating in the same manner as image disks 52, is located between mirror set 20 and projection lens 14, as seen in FIG. 2. A dissolve disk 53 is supported by rollers 55 and a drive roller 57 on the drive shaft of motor 59. Dissolves of a single or between two or more projectors may be accomplished by using as a dissolve disk 53 in each projector a disk varying in optical density radially around the disk. As the disk in one projector is rotated from fully transparent to opaque, the other projector's disk is rotated from opaque to transparent. Thus, with both projectors focussed on the same screen, the image will dissolve from the projected image of the first projector to the projected image of the second projector. If desired, a sliding gate similar to side 22 could be used to produce dissolves in place of dissolve disk 53.

Means for varying projected image size is also shown in FIG. 3, considered with FIG. 1. An opaque slide 22 is located between mirror set 20 and rotatable disks 52. Slide 22 is slidable along a line perpendicular to the projector optical axis between a wall 64 and guides 66. A first end of slide 22 has an arcuate cutout 68 located so that slide 22 fully blocks the projection optical path in the closed position while entirely uncovering that path in the open position. Slide 22 is moved between those two positions by a motor 70 rotating an eccentric arm 72 having a pin 74 riding in slot 76 in slide 22. A pair of limit switches 78 and 80 are activated by the end of eccentric arm 72 at the fully open and fully closed positions, respectively. Of course, motor 70 may be stopped at intermediate positions to provide any desired image effect. If the slide 22 is close to image disks 52, a "wipe" effect will result as the slide moves across the optical path. If slide 22 is well separated from the image disks, the effect will be a change in overall image brightness. Switches 78 and 80 are schematically illustrated in FIG. 3 but are omitted from schematic FIG. 1 for clarity of illustration.

The mechanism for varying the angle between mirrors 82 and 84 making up the kaleidoscopic mirror set 20 is schematically illustrated in FIG. 4. Mirrors 82 and 84 are preferrably first surface mirrors flexibly hinged along the meeting line 86, such as by flexible plastic tape. Mirrors 82 and 84 are biased apart by a paid of springs 88, one of which is shown in FIG. 4, the other being located correspondingly with mirror 84. A pair of end walls 90 and 92 support the mirror pivot rod 94 along hinge line 86 and a pair of cam shafts 96 and 98. Shaft 96 and 98 carry cam members 100 and 102 which bear on a pair of mirror-mounted cam followers 104, only that on mirror 82 being seen. A motor 106 has a double pulley 108 mounted on its output shaft to drive belt 110. Belt 110 is threaded around two idler pulleys 112 and 114 and two cam shaft drive pulleys 116 and 118. Thus, as motor 100a is rotated, cam shafts 96 and 98 are rotated in opposite directions as the same speed, so that cams 100 and 102 move mirrors 82 and 84 toward and away from each other uniformly. A pair of flanges 120 and 122 are secured to mirrors 82 and 84, respectively, to prevent light leakage down past the outside of mirrors 82 and 84 when the inter-mirror angle is small. Thus, motor 100a may be stopped at any selected inter-mirror angle, or may be continuously operated to continuously and cyclically vary mirror position.

Many of the components of this system produce heat, which must be removed efficiently to prevent damage to the electronic components, image disks, etc. These components are arranged to provide highly effective cooling. As mentioned above, conventional blower 28 is located so as to receive air from the interior of housing 18 and eject it through the bottom of housing 18 through a number of openings. Inlet openings 130 behind electronic box 132 and the other electronic components located at the left end of the housing as shown in FIG. 1. Simultaneously, air flows past projection lens 14, and the mirror set 20 (omitted from FIG. 5 for clarity), air enters through openings 134 and flows past electronics box 30 and air enters through disk slots 54, flowing past the portion of the image disks in the optical path. Thus, as illustrated by the air flow arrows in FIGS. 1 and 5, air first passes the most critical components, e.g., electronic components, image disks and optical components, (while the air is most cool) then past the hottest components, e.g., condensing lens set and projection lamp before exiting the housing. This has been found to produce highly effective cooling, assuring long useful life for the critical components.

All of the mechanism drive motors 50, 60, 62, 70 and 100a may be operated manually, with simple on-off switches, if desired. The operator would observe the projected image turning on a selected motor and then either turn it off when the desired effect is achieved or allow it to continue to operate in a cyclic mode. In many cases, all motors will be allowed to operate simultaneously, providing a continually changing projected image with an almost infinite repetition cycle. However, in other cases it will be desireable to provide more complete and exact control over the many image variables. One such control system is schematically illustrated in FIG. 6, operating through control panel 12 shown in FIG. 1.

As seen in FIG. 6, the control components are contained in panel 12, while the various motors, conventional power supply 140, including transformer 142, are contained in projector housing 18, these being connected by wires gathered in cable 143.

Mirror control 144 includes a variable potentiometer switch 148 to vary motor speed, a "run pause" push button switch 150 which turns the motor 100a on only when pressed, a forward continuous switch 152 and a reverse switch 154.

Two identical image disk control modules 156 and 158, each of which operates one of slide motors 60 and 62 are shown. Of course, additional image disk controls would be used if more than two image disks and associated drive motors are provided. These controls are substantially identical to the mirror control means 144. Each disk control 156, 158 includes a variable potentiometer 160, 161; a run pause switch 162, 163, an activate switch 164, 165 and a reverse switch 166, 167, respectively. Thus, the image disks may be rotated at any selected speed, either forward or reverse, either continuously or incrementally.

Focus of projection lens 14 is varied, either selectively or continuously, through focus control 168. The speed of focus drive motor 50 is varied by slide switch 170. Either forward or reverse operation is selected by switch 172. Switch 174 may be engaged momentarily to change focus slightly, or may be left closed for continuous focus variation.

Aperture motor 70 is controlled by aperture control 176. The speed of motor 70 is adjusted by variable potentiometer slide switch 178. Switch 180 can be placed in positions to either open or close the aperture. When the aperture is fully open or fully closed, limit switches 78 and 80 will stop motor 70. If continuous operation is desired, switch 186 is closed, overriding the limit switches.

Where it is desired to "fade" images from one projector to another, by dimming the projector lamp in one projector while simultaneously brightening the lamp in another focussed on the same screen, a conventional dimmer circuit 190 may be included in the circuit of each projection lamp 26. The rate and timing of fading is controlled by control 192. The light output from projection lamp 26 can be turned fully on by switch 194, acting through a pre-heat variable resistor 196. Light level may be selected through slide switch variable potentiometer 198. The rate of fading may be adjusted by slide switch variable potentiometer 200 which controls the drive means of a conventional dimmer actuator. Thus, the light level may be selected, or may be caused to vary cyclically.

In addition to power supply 140 furnishing ±15 volt power to the control and drive circuits, a reference supply 201 may be provided to provide a selected reference voltage to the control circuitry. Also, conventional motor drivers such as MC3320 Class B Audio Drivers from Motorola may be used to drive motors 50, 60, 62, 70 and 100a. Each of the control means described above may use conventional electro-mechanical mechanisms or transistor circuitry, as desired.

While certain specific arrangements, proportions, control means, etc., were detailed in the above description of a preferred embodiment, these may be varied or other components may be used, where suitable, with similar results.

Other variations, applications and ramifications of the present invention will occur to those skilled in the art upon reading this disclosure. These are intended to be included within the scope of this invention, as defined in the appended claims.

I claim:

1. A projection kaleidoscope capable of producing widely and rapidly varying optical effects which comprises:
   a housing;
   a focusable projection lens mounted on said housing and extending outwardly thereof;
   a kaleidoscope mirror set within said housing adjacent to said projection lens, said mirror set comprising two planar mirrors in hinged contact along one edge and lying in planes substantially parallel to the optical axis of said projection lens;

a condensing lens assembly adjacent to said mirror set having an optical axis substantially aligned with the optical axis of said projection lens;

at least two substantially parallel rotatable disks extending between said condensing lens assembly and said mirror set, said disks being at least partially transparent and bearing imageable material;

means to actuate said projection lamp whereby a kaleidoscopic image of imageable material on said disks is imaged on a surface spaced from said projection lens;

means for continuously cyclically changing focus of said projection lens during projector operation;

control means for selecting between said continuous cyclic focus changing and a selected single focus;

means for selectively varying relative rotational speeds of said at least two disks;

means for selectively varying the angle between said kaleidoscope mirrors, whereby a wide variety of projected image patterns may be obtained on said surface; and aperture means movable between a first position blocking light passage along said optical axis and a second position permitting light passage along said optical axis, drive means for selectively continuously cyclically moving said aperture means between said two positions and control means for selectively stopping said aperture means at any of said two positions and any intermediate position.

2. A projection kaleidoscope capable of producing widely and rapidly varying optical effects which comprises:

a housing;

a focusable projection lens mounted on said housing and extending outwardly thereof;

a kaleidoscope mirror set within said housing adjacent to said projection lens, said mirror set comprising two planar mirrors in hinged contact along one edge and lying in planes substantially parallel to the optical axis of said projection lens;

spring means biasing said mirrors toward a wider inter-mirror angle, a pair of cams engaging cam followers on the mirror backs and a motor adapted to drive said cams through a pulley system which rotates said cams in opposite directions at the same speed, whereby the angle between said mirrors is cyclically increased and decreased;

a condensing lens assembly adjacent to said mirror set having an optical axis substantially aligned with the optical axis of said projection lens;

at least two substantially parallel rotatable disks extending between said condensing lens assembly and said mirror set, said disks being at least partially transparent and bearing imageable material;

means to actuate said projection lamp whereby a kaleidoscopic image of imageable material on said disks is imaged on a surface spaced from said projection lens;

means for continuously cyclically changing focus of said projection lens during projector operation;

control means for selecting between said continuous cyclic focus changing and a selected single focus;

means for selectively varying relative rotational speeds of said at least two disks; and means for selectively varying the angle between said kaleidoscope mirrors;

whereby a wide variety of projected image patterns may be obtained on said surface.

3. A projection kaleidoscope capable of producing widely and rapidly varying optical effects which comprises:

a housing;

a focusable projection lens mounted on said housing and extending outwardly thereof;

a kaleidoscope mirror set within said housing adjacent to said projection lens, said mirror set comprising two planar mirrors in hinged contact along one edge and lying in planes substantially parallel to the optical axis of said projection lens;

a condensing lens assembly adjacent to said mirror set having an optical axis substantially aligned with the optical axis of said projection lens;

at least two substantially parallel rotatable disks extending between said condensing lens assembly and said mirror set, said disks being at least partially transparent and bearing imageable material;

each of said disks extends into said housing through a slot in said housing and rests on a bearing roller and a motor drive roller so that the disk is rotated by rotation of said drive rollers engaging the disk edge and the disk remains easily removable and replaceable through said slot and the edges of said slot maintain said disks in a vertical spaced-apart relationship;

means to actuate said projection lamp whereby a kaleidoscopic image of imageable material on said disks is imaged on a surface spaced from said projection lens;

means for continuously cyclically changing focus of said projection lens during projector operation;

control means for selecting between said continuous cyclic focus changing and a selected single focus;

means for selectively varying relative rotational speeds of said at least two disks; and means for selectively varying the angle between said kaleidoscope mirrors;

whereby a wide variety of projected image patterns may be obtained on said surface.

4. A projection kaleidoscope capable of producing widely and rapidly varying optical effects which comprises:

a housing;

a focusable projection lens mounted on said housing and extending outwardly thereof;

a kaleidoscope mirror set within said housing adjacent to said projection lens, said mirror set comprising two planar mirrors in hinged contact along one edge and lying in planes substantially parallel to the optical axis of said projection lens;

a condensing lens assembly adjacent to said mirror set having an optical axis substantially aligned with the optical axis of said projection lens;

at least two substantially parallel rotatable disks extending between said condensing lens assembly and said mirror set, said disks being at least partially transparent and bearing imageable material;

means to actuate said projection lamp whereby a kaleidoscopic image of imageable material on said disks is imaged on a surface spaced from said projection lens;

means for continuously cyclically changing focus of said projection lens during projector operation;

said focus changing means comprises a centrally pivoted first arm having one end operatively secured to an axially movable lens portion and the other end connected to a second arm driven by an eccentric pin on a motor driven rotatable disk, whereby said first arm is pivoted back and forth, moving said lens portion to change projection lens focus;

control means for selecting between said continuous cyclic focus changing and a selected single focus;

means for selectively varying relative rotational speeds of said at least two disks; and means for selectively varying the angle between said kaleidoscope mirrors;

whereby a wide variety of projected image patterns may be obtained on said surface.

5. The kaleidoscopic projector according to claims 1, 2, 3 or 4 further including a blower means located within said housing adapted to pull air from within said housing and eject air out of the bottom of said housing, and a plurality of openings in said housing located so that air enters said openings, passes first over the most temperature sensitive components in said housing, then over less temperature sensitive components, and finally to said blower for ejection from said housing.

6. The kaleidoscopic projector according to claims 1, 2, 3 or 4 wherein said projection lamp optical axis lies at an angle of about 6 to 15 degrees to said projection lens optical axis.

7. The kaleidoscopic projector according to claims 1, 2, 3 or 4 including means to selectively continuously cyclically dim and brighten projection lamp intensity.

8. The kaleidoscopic projector according to claims 1, 2, 3 or 4, wherein a translatable opaque slide member is positioned between said rotatable disks and mirror set for varying the size of said kaleidoscopic image during translation.

* * * * *